United States Patent
Ely

(10) Patent No.: US 9,196,044 B2
(45) Date of Patent: Nov. 24, 2015

(54) FALSE ALARM REJECTION FOR BOAT DETECTION CANDIDATES

(71) Applicant: RAYTHEON COMPANY, Waltham, MA (US)

(72) Inventor: Richard W. Ely, Lewisville, TX (US)

(73) Assignee: RAYTHEON COMPANY, Waltham, MA (US)

( * ) Notice: Subject to any disclaimer, the term of this patent is extended or adjusted under 35 U.S.C. 154(b) by 87 days.

(21) Appl. No.: 14/191,147

(22) Filed: Feb. 26, 2014

(65) Prior Publication Data

US 2015/0243032 A1    Aug. 27, 2015

(51) Int. Cl.
- *G06K 9/00* (2006.01)
- *G06T 7/00* (2006.01)
- *G06T 7/40* (2006.01)
- *G06K 9/46* (2006.01)

(52) U.S. Cl.
CPC ............ *G06T 7/0042* (2013.01); *G06K 9/4647* (2013.01); *G06T 7/0083* (2013.01); *G06T 7/0093* (2013.01); *G06T 7/408* (2013.01); *G06T 2207/20072* (2013.01); *G06T 2207/20144* (2013.01); *G06T 2207/20148* (2013.01); *G06T 2207/30252* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,717,873 | A | * | 2/1973 | Riggs ............................. 342/41 |
| 4,546,354 | A | * | 10/1985 | Boles ............................ 342/179 |
| 5,027,413 | A | * | 6/1991 | Barnard ........................ 382/103 |
| 5,231,609 | A | * | 7/1993 | Gaer .............................. 367/99 |
| 6,674,902 | B1 | * | 1/2004 | Kondo et al. .................. 382/199 |
| 7,430,303 | B2 | * | 9/2008 | Sefcik et al. .................. 382/103 |
| 8,094,886 | B1 | * | 1/2012 | Roskovensky et al. ....... 382/103 |
| 8,116,522 | B1 | * | 2/2012 | Buck et al. .................... 382/103 |
| 8,170,272 | B1 | * | 5/2012 | Joslin et al. ................... 382/100 |
| 8,422,738 | B1 | * | 4/2013 | Stastny et al. ................. 382/103 |
| 2003/0185420 | A1 | * | 10/2003 | Sefcik et al. .................. 382/103 |
| 2007/0216566 | A1 | * | 9/2007 | Wood ............................ 342/41 |

* cited by examiner

*Primary Examiner* — Anand Bhatnagar
(74) *Attorney, Agent, or Firm* — Christie, Parker & Hale, LLP

(57) ABSTRACT

A method for rejecting false alarms in preliminary detected ship candidates includes: receiving an image including the plurality of preliminary ship candidates; computing intensity and gradient statistics from an image background around each of the preliminary ship candidates; determining a set of thresholds from the computed intensity and gradient statistics; determining an outline and an orientation for each of the preliminary ship candidates, using the computed intensity and gradient statistics; extracting a plurality of features from each of the outlines and orientations of the preliminary ship candidates, wherein the plurality of features includes intensity-based features, gradient-based features, texture-based features and shape-based features; and rejecting false alarms in the plurality of preliminary detected ship candidates using the extracted features and the determined thresholds and statistical distance classifiers.

16 Claims, 9 Drawing Sheets

FALSE ALARM REJECTION FOR BOAT DETECTION CANDIDATES

FIELD OF THE INVENTION

The present invention relates generally to feature extraction; and more particularly to a system and method for rejecting false alarms of ship/boat candidates detection.

BACKGROUND

In data processing, feature extraction is a special form of dimensionality reduction. When the input data to a process (algorithm) is too large to be processed and it includes some redundancy, the input data may be transformed into a reduced representation set of features, i.e., a features vector. If done properly, the features set includes the relevant information from the input data to perform the desired task using the reduced representation by the feature vectors. Feature extraction techniques simplify the amount of data required to describe a large set of data accurately.

Feature extraction has been widely used in image processing and object detection and recognition which use different algorithms to detect and isolate various features of a dataset, for example, digitized image or video, and detect object(s) within those images or videos. Object recognition is the task of finding and identifying objects in an image or video sequence. Many approaches to the task have been implemented over past several years, such as edge detection, or recognition by parts. In a typical feature-based approach, such as edge detection, a search is used to find feasible matches between object features and image features. The primary constraint of these approaches is that a single position of the object must account for all of the feasible matches. These methods then extract features from the objects to be recognized and the images to be searched.

Classification is a method of identifying to which of a set of categories (classes) a new observation belongs, on the basis of a training set of data containing observations (or instances) for which their category is already known. The individual observations are analyzed into a set of quantifiable properties, known as features.

A classifier is a classification algorithm. In the context of machine learning, classification is considered an instance of supervised learning, for example, learning where a training set of correctly identified observations (features) is available. The corresponding unsupervised procedure is known as clustering, which comprises of grouping data into categories based on some measure of inherent similarity. For example, the distance between instances, considered as vectors in a multi-dimensional vector space. In machine learning, the observations are often known as instances, the explanatory variables are termed features and the possible categories to be predicted are classes.

A common subclass of classification is probabilistic classification. Algorithms of this nature use statistical inference to find the best class for a given instance. Unlike other algorithms, which simply output a best class, probabilistic algorithms output a probability of the instance being a member of each of the possible classes. Typically, the best class is then selected as the one with the highest probability.

Classification and clustering are examples of the more general problem of pattern recognition, which is the assignment of an output value to a given input value. Other examples are regression, which assigns a real-valued output to each input; or sequence labeling, which assigns a class to each member of a sequence of values, for example, part of speech tagging, which assigns a part of speech to each word in an input sentence.

A training set is a set of data used to discover potentially predictive relationships. In machine learning field, a training set includes an input vector and an answer vector, which are used together with a supervised learning method to train a knowledge database. In statistical modeling, a training set is used to fit a model that can be used to predict a "response value" from one or more "predictors." The fitting can include both variable selection and parameter estimation. Statistical models used for prediction are often called regression models, of which linear regression and logistic regression are two examples.

Most of the current Ocean Ship Detection (OSD) screening algorithms are designed to operate in open ocean and use a land mask to eliminate the parts of the scene that are on or near land. These screeners examine the entire image, except for the land mask derived from Digital Terrain Elevation Data (DTED), and find anomalies in the water that could be ships. The screening algorithm is designed to find candidates of all sizes and to operate in all kinds of weather and sea conditions. It uses simple features whose thresholds are designed to provide a very high detection rate (at the expense of a high false alarm rate).

However, these screening algorithms typically have many false alarms due to, for example, small clouds, white caps in the sea and surf lines. Some of the current OSD ship screening algorithm produces almost 10 false alarms for every real ship it detects. Depending on the mission, the impact of the high OSD false alarm rate ranges from mildly annoying to a complete showstopper. This greatly reduces the analyst workload and allows OSD to be useful in applications where small false alarm rates are required.

Accordingly, there is a need for a ship/boat detection technique that is capable of rejecting the false alarms due to the surroundings of the ships/boats and is less complex and computationally intensive and provides high accuracy for the detection.

SUMMARY

The present invention is capable of eliminating the majority of the false alarms, while retaining almost all of the detected ships/boats by segmenting out each detected ship candidate from the water and air backgrounds.

In some embodiments, the present invention is a computer implemented method for rejecting false alarms in a plurality of preliminary detected ship candidates. The method includes: receiving an image including the plurality of preliminary ship candidates; computing intensity and gradient statistics from an image background around each of the preliminary ship candidates; determining a set of thresholds from the computed intensity and gradient statistics; determining an outline and an orientation for each of the preliminary ship candidates, using the computed intensity and gradient statistics; extracting a plurality of features from each of the outlines and orientations of the preliminary ship candidates, wherein the plurality of features includes intensity-based features, gradient-based features, texture-based features and shape-based features; and rejecting false alarms in the plurality of preliminary detected ship candidates using the extracted features and the determined thresholds and statistical distance classifiers.

DETAIL DESCRIPTION

In some embodiments, the present invention operates on the detections produced by the OSD screener. The screener examines the entire image (except for the land mask derived from DTED) and finds anomalies in the water that could be ships. OSD is designed to find candidates of all sizes ranging from supertankers down to small boats, and to operate in all kinds of weather conditions and sea states. The OSD screener uses features whose thresholds are designed to provide a very high detection rate (at the expense of a high false alarm rate). The invention then extracts intensity features, gradient features, edge phase features, texture features and shape-based features to discriminate real ships from false alarms. The false alarm rejection examines each candidate in more detail to determine which candidates to keep and which to reject. In some embodiments, a classification system applies a set of feature thresholds and a set of distance statistical classifiers, for example, Mahalanobis distance statistical classifiers, to retain the ships/boats and eliminate the false alarms. The Mahalanobis distance is a descriptive statistic that provides a relative measure of a data point's distance from a common point and is typically used to identify and gauge similarity of an unknown sample set to a known sample set.

Although some examples are described in the context of an OSD screener, the false alarm rejection of the present invention works with the candidates from any screener.

In some embodiments, the present invention extracts several novel features from the ship candidate's outline and the interior of its outline from the background of the outline. The invention then uses novel schemes to normalize these extracted features. A normalization process typically rescales by multiplying the feature by a factor derived from the entire image or from the background region around the target or from the totality of all the candidates. For example, if there is a feature that measures the contrast of the candidate with the background, then images with low dynamic range will necessarily produce candidates with lower contrast. Accordingly, to make contrast a more consistent feature over all images, the dynamic range of the image can be measured and the contrast feature can be rescaled for normalized by dividing by the dynamic range width. Accordingly, to make a ship gradient feature more consistent, the average background gradient can be measured and the gradient feature can be rescaled or normalized by dividing by the average background gradient.

In some embodiments, the classification system uses two types of feature threshold sets and four Mahalanobis distance statistical classifiers to separate ships (ranging from supertankers down to small boats) from the most frequent sources of false alarms including small clouds, white caps and surf lines. In some embodiments, the present invention operates on the detections produced by an OSD screener.

Figure 1:
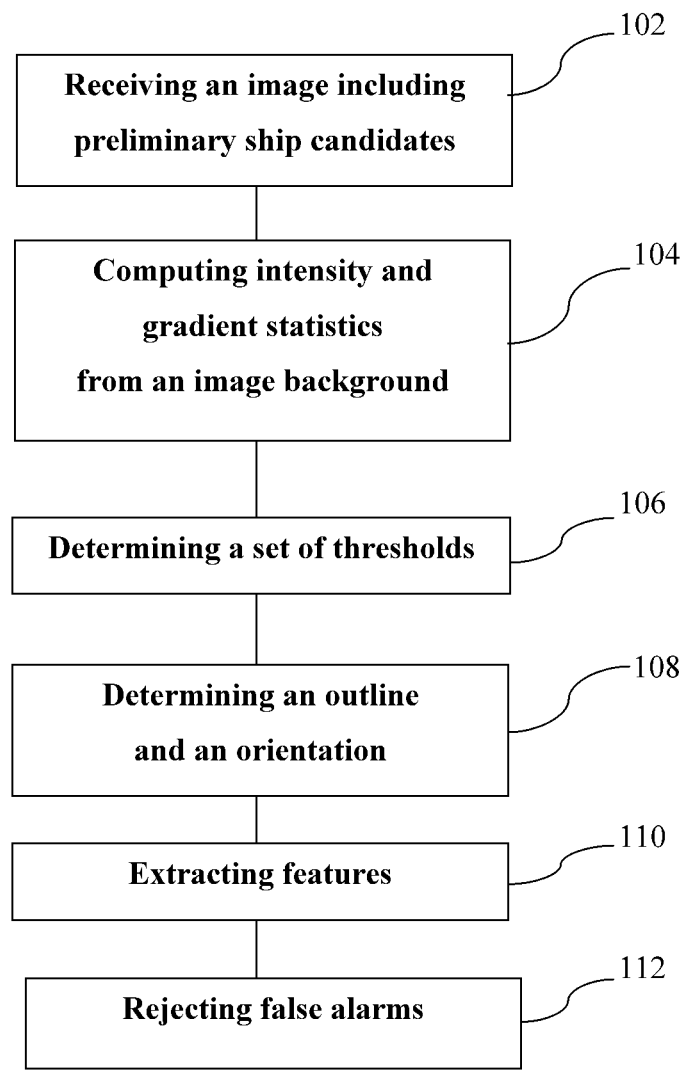
FIG. 1 is an exemplary process flow, according to some embodiments of the present invention.

FIG. 1 is an exemplary process flow, implemented by one or more computers, according to some embodiments of the present invention. As shown in block 102, an image including a plurality of preliminary ship candidates are received, for example, from an OSD screener. Intensity and gradient statistics are then computed from an image background around each of the preliminary ship candidates, in block 104. In block 106, a set of thresholds are determined from the computed intensity and gradient statistics. That is, the image background statistics are used to dynamically determine thresholds for segmenting the ship from its background, but these background statistics can also be used to normalize the ship features.

In block 108, an outline and an orientation for each of the preliminary ship candidates are computed, using the computed intensity and gradient statistics. A plurality of features are then extracted from each of the outlines and orientations of the preliminary ship candidates, in block 110. In some embodiments, the plurality of features include intensity-based features, gradient-based features, texture-based features and shape-based features. In block 112, the false alarms in the plurality of preliminary detected ship candidates are rejected using the extracted features and the determined thresholds and statistical distance classifiers.

Figure 2:
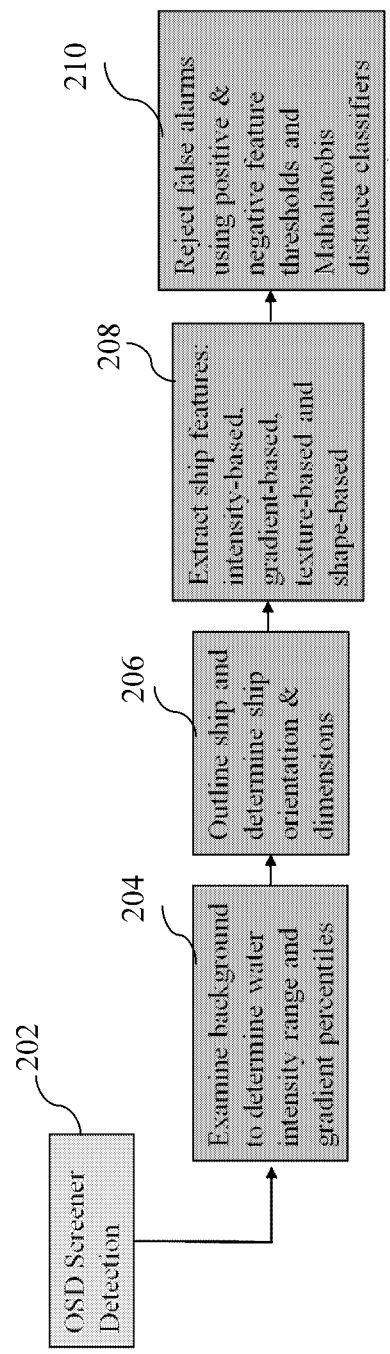
FIG. 2 is an exemplary process flow, according to some embodiments of the present invention.

FIG. 2 is an exemplary process flow, implemented by one or more computers, according to some embodiments of the present invention. As shown in block 204, the invention first gathers intensity and gradient statistics from the image background around the (preliminary) detected ship candidate (provided by an OSD screener 202) to determine thresholds to use in segmenting the ship from the background, as describe below. In block 206, the invention outlines the detected ship candidate and determines ship orientation and dimensions, using the pixels belonging to the ship.

Figure 3:
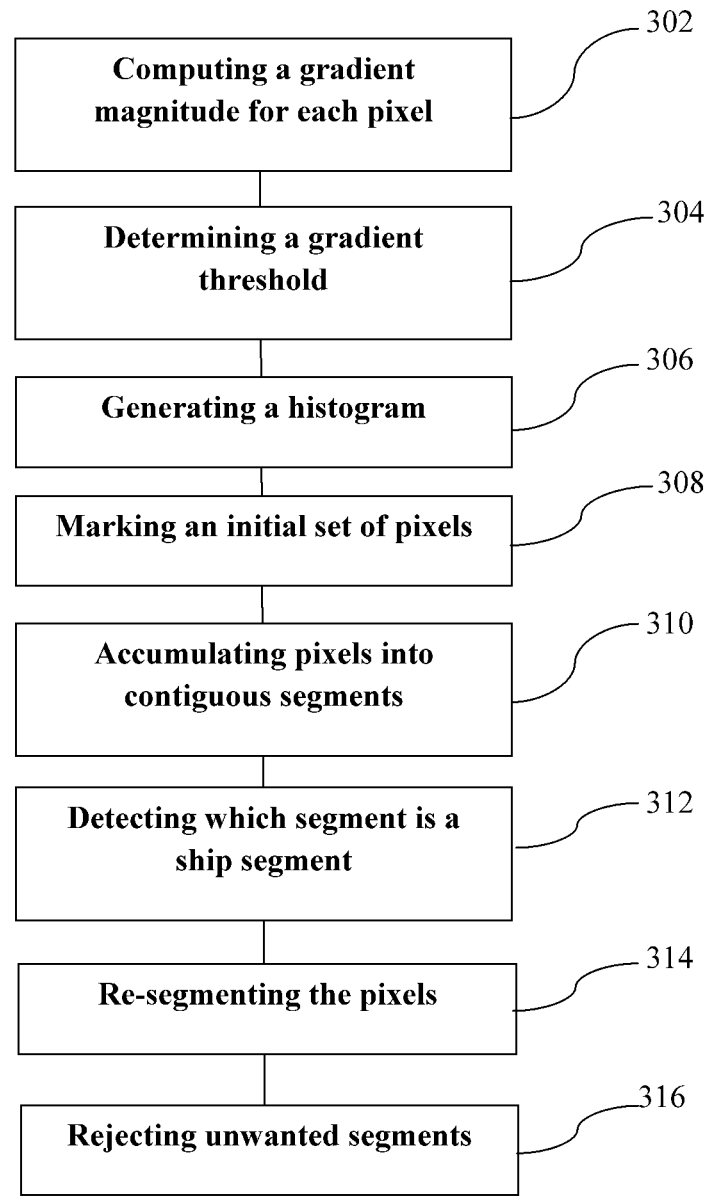
FIG. 3 is an exemplary process flow for ship outlining, according to some embodiments of the present invention.

FIG. 3 is an exemplary process flow for ship outlining, according to some embodiments of the present invention. As shown in block 302, the computer implemented outlining process computes a gradient magnitude for each pixel in a region around the centroid of the OSD detected ship candidate. The outlining process, executed by one or more processors, then determines a gradient threshold to mark an initial set of candidate ship pixels, in block 304. If this gradient threshold is too low (below the calculated threshold), pixels from the background will be marked along with the ship pixels. If the threshold is set too high (above the calculated threshold), only a sparse set of ship pixels will be marked. To calculate the best threshold, in some embodiments, the sub-image around the centroid (region around the centroid) is divided into several, for example, five regions. There is a small region in the center which is expected to be comprised mostly of ship pixels. The background is also divided into several regions, for example, four quadrants. In block 306, the process then generates a histogram for the gradient magnitudes in the center quadrant and the four background quadrant independently. The background, i.e., water, is expected to have smaller gradients than the ship.

Figure 4A:
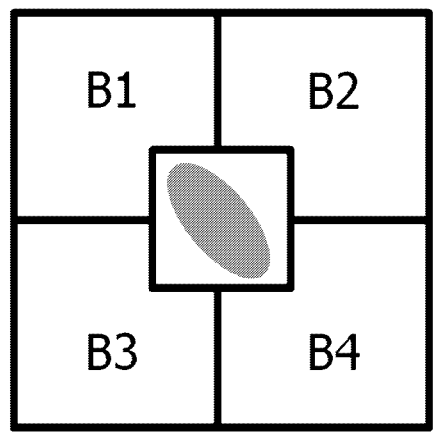
FIGS. 4A and 4B depict exemplary segmentations of a detected ship candidate, according to some embodiments of the present invention.
Figure 4B:
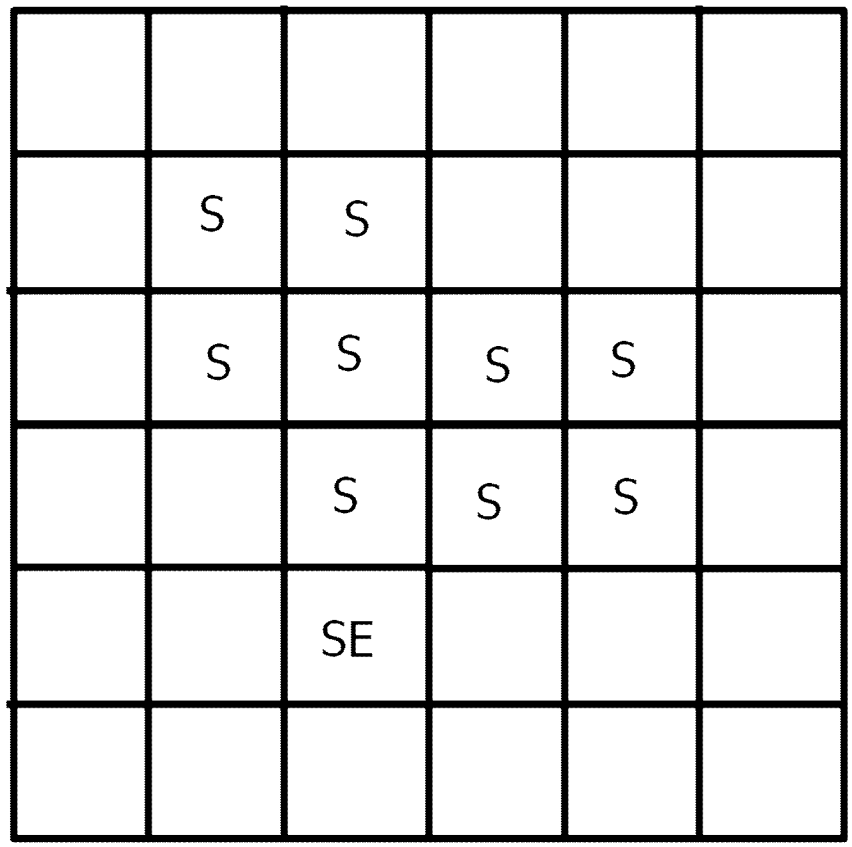

FIGS. 4A and 4B depict exemplary segmentations of a detected ship candidate, according to some embodiments of the present invention. A ship in the center quadrant and the four background quadrants, B1 through B4 are shown. Since there may be other ships nearby present in one or more of the background quadrants (which would influence the background statistics), a separate (or independent) histogram is computed for each quadrant from the image pixels in that quadrant. For the center quadrant, a median gradient is computed and for the background gradient, the second smallest $75^{th}$ percentile value over the four background quadrants is taken. In other words, the $75^{th}$ percentile value is computed for each quadrant and then sort those four values and take the second lowest value as our background gradient value. Other percentiles may be used for different applications and/or backgrounds. The initial gradientthreshold is chosen to the second lowest value over the four quadrant's $75^{th}$ percentile values.

Since very large reconnaissance images are being screened, often with more than a billion pixels, the false alarm rejection approach of the present invention works locally in a subimage centered around the detection. For example, FIG. 4A represents an image chip (or subimage) around the candidate that has been extracted from the full image. The size of this subimage (i.e., number of rows and columns) is a parameter value that can be changed based on the resolution of the image, that is, based on the ground scale of the pixels in the row and column directions. The process then marks all the pixels in the subimage whose gradient exceeds the threshold, in block 310. Given the way the threshold was chosen, it is expected that the background will only produce a sparse set of points while the majority of the pixels on the ship will exceed the threshold. The invention then eliminates isolated pixels, for example, those pixels that have at least one opposite pair in an 8-neighborhood that are not marked, in block 310. For example, if S, in FIG. 4B, represents pixels in the image whose gradient magnitude exceeds the ship pixel threshold then the pixel "SE" at the bottom is an isolated pixel and needs to be eliminated, because it has opposite neighbors (left and right) that are not marked as ship pixels. Opposite pixels in a 8-neighborhood around a center pixel are left-right, up-down, or opposite pixels on one or the other diagonal.

The invention then accumulates the pixels that pass the threshold into contiguous segments, in block 312. The invention may also eliminate segments that are too small to be the ship segment. In block 314, the computer implemented process determines which segment (if more than one exists) is the ship segment. Ideally, we are looking for a large segment with high gradient near the OSD candidate's centroid. The metric that accomplishes this is to average the gradient magnitude over all the segment pixels and divide by the average distance from the centroid of all the segment's pixels. The segment with the largest metric is taken to be the ship segment, associated with the OSD candidate. However, if the OSD centroid was centered on a different candidate outline, then the average distance from centroid metric would favor that segment and it would be selected as the ship segment associated with the OSD candidate. In typical operations, OSD would detect each of these as a separate candidate and the segmentation algorithm would correctly select the segment nearest the centroid of the OSD detection.

As an example, a ship near the center of the subimage would have some small whitecaps in one or more of the background quadrants. When the pixels are thresholded by gradient value, many of the ship pixels are above the threshold and some of the pixels on and around the whitecaps are also above the threshold. When the thresholded pixels are collected into contiguous segments, there will be a large segment near the centered containing ship pixels and a lot of smaller segments in the background containing white caps. The process identifies the large segment near the center as the ship segment and eliminates the smaller segments in the background.

The resulting ship segment is highly dependent on the gradient threshold that was computed. If needed, the invention then (optionally) performs a re-segmentation of the image (pixels), in block 316. In some embodiments, the invention applies a number of tests to determine whether to re-segment or not. In block 318, the process rejects unwanted segments if a) the segment is too large or too small; b) there are too few interior pixels in segment; c) the number of pixels in the segment is a low fraction of the number of pixels in the segment's convex hull; d) the number of boundary pixels is too large compared with the rectangular bounds of the segment; and/or e) the distance from the OSD candidate centroid to the center line of the segment is too large. In some re-segmentation processes, the invention uses the median gradient around the center region of the OSD centroid. If the resulting segment passes all the criteria, the invention then uses that segment. Otherwise, the segment from the original attempt is used. The above described ship segmentation allows calculation of first metrics by using only ship pixels and calculation of second metrics by using only background pixels.

Figure 7:
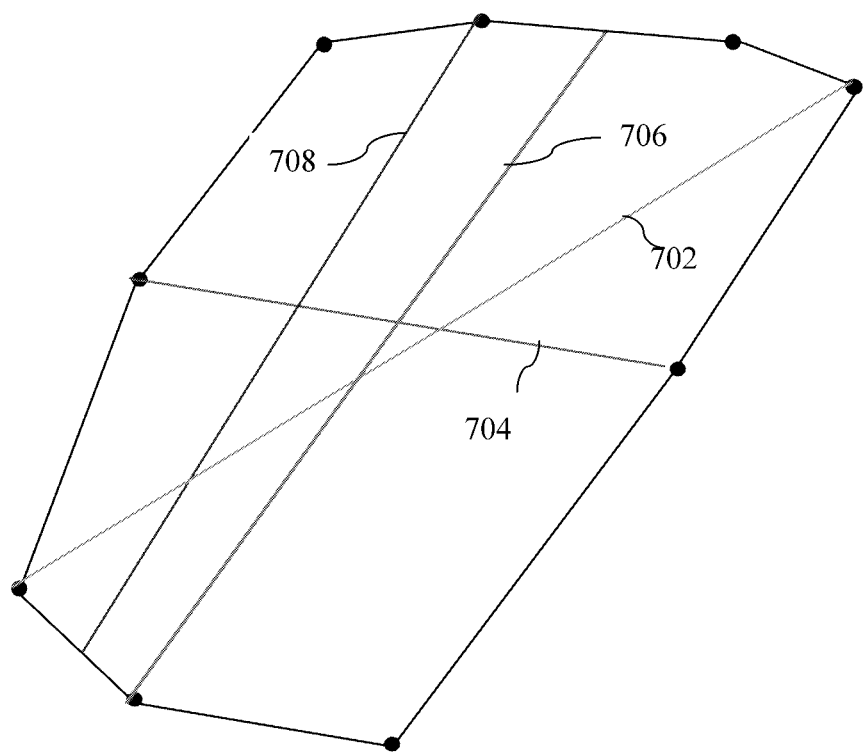
FIG. 7 shows an example for determination of a ship orientation, according to some embodiments of the present invention.

FIG. 7 shows an example for determination of a ship orientation, according to some embodiments of the present invention. In some embodiments, the invention determines the ship orientation from the ship length vector. A process that determines a length vector for the ship first finds (determines) an ordered set of vertices of the convex hull of the ship segment. These are represented by the black dots in FIG. 7. These points are augmented by the midpoint between every consecutive pair of vertices. Every line segment between any two of these points are then considered by the process. The process looks for the line segment that optimizes one or more of the following set of criteria: (1) the line segment is as long as possible, (2) the line segment has half the pixels from the segment on one side and half on the other, that is, it does not have a lot more pixels on one side than the other, (3) the same thing should be true at either end of the line. For example, line 708 does not satisfy the second criterion. In contrast, line 702 satisfies the first two criteria, however, at either end of line 702, there are a lot more pixels on one side than the other. The fourth criterion optimizes the total distance of all of the pixels in segment from the line should be smaller than for the line through the midpoint that is in the perpendicular orientation. For example, line 704 would not be the best choice, because the pixels in the segment are father from it, on average, than for line 706, which is in the perpendicular direction. These metrics are combined in a weighted sum to yield the best line. As depicted in FIG. 7, line 706 has all the properties that we are looking for and gets the highest score.

In some embodiments, the computer executed process that computes the ship orientation performs the following steps:
    a) for each side, measure the total distance to the line of points in the target segment that are on that side of the line, denoted by $d_l$ and $d_r$;
    b) exclude a region in the middle of the line, sum the distances for the "left" points at one end of the line with the "right" points at the other end and vice versa, denoted by $e_1$ and $e_2$ (this feature is used to eliminate segment diagonals);
    c) form the line through the midpoint but perpendicular to the "length" line and compute the total distance to this line of points in the target segment, denoted by $d_{perp}$, where length line metric is a linear combination of four features; and d) compute the score as: Score=Line length+fac1*MIN($d_1$, $d_r$)/MAX($d_1$,$d_r$)+fac2*MIN($e_1$,$e_2$)/MAX($e_1$,$e_2$)−fac3* ($d_1$+$d_2$)/$d_{perp}$ Note that the metric above is greatest when the line length is long, the ratios of the distances in the middle two terms is close to 1.0 and the ratio in the last term is small.

Referring back to FIG. 2, the invention then uses the ship outline to extract a variety of features from the image in the interior, the boundary and the exterior of the outline, in block 208. In some embodiments, the features include four categories: intensity-based features, gradient-based features, texture-based features and shape-based features. In block 210, the calculated features are then sent to the classification process which determines which candidates should be kept and which ones to reject.

Figure 5:
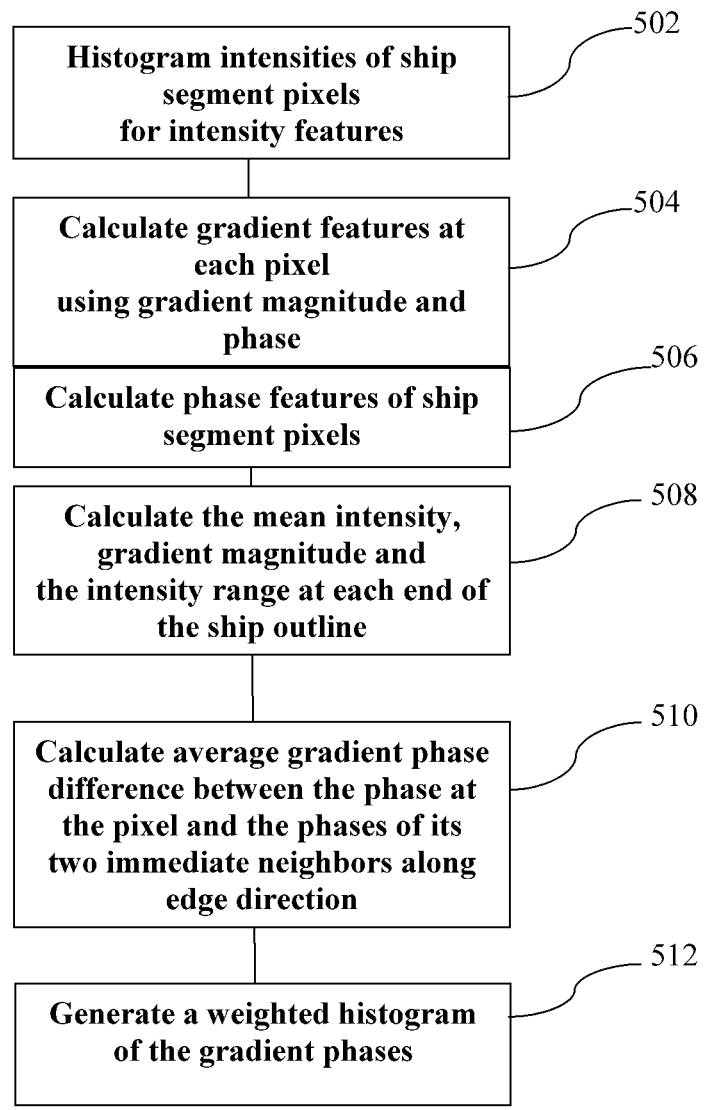
FIG. 5 is an exemplary process flow for feature computation, according to some embodiments of the present invention.

FIG. 5 is an exemplary process flow, executed by one or more processors, for feature computation, according to some embodiments of the present invention. The intensity feature calculation process histograms the intensities of the pixels in the ship segment, as shown in block 502. In some embodiments, features include the mean intensity, standard deviation and range, the difference between the $80^{th}$ percentile value and $20^{th}$ percentile value, the ship contrast with the background and the fraction of ship pixels with good contrast from the background, and optionally, a few other normalized contrast metrics. This process also counts how many ship pixels have a gradient magnitude greater than the background $80^{th}$ percentile value and again using the $90^{th}$ percentile value.

The gradient feature calculation process uses a gradient operator, such as the Sobel, to compute a gradient magnitude and phase at each pixel in the ship segment, in block 504. In some embodiments, features include the maximum gradient, the mean gradient and standard deviation, the difference between the $80^{th}$ percentile value and the $20^{th}$ percentile value, and a count of how many pixels have gradient magnitude greater than the $80^{th}$ percentile of the gradient magnitude of the background pixels and again for the $90^{th}$ percentile. This process also calculates normalized gradient features using the width of the background intensity range and the average background gradient magnitude.

A phase feature calculation process uses the gradient phase values over all the pixels in the ship segment, in block 506. The gradient phase describes the direction the gradient is pointing to. Ships tend to have more organized phase values than false alarms. The process calculates the principal phase direction, for example, by using a weighted sum histogram with the gradient magnitude at the pixel as a weight factor, accordingly, stronger edges get more weight factor. The invention then finds the principal phase direction (modulo 180 degrees) using a two-pane summing window over the histogram with the second pane offset 180 degrees from the first. The center of the window with the largest sum is taken to be the principal phase direction.

Figure 8:
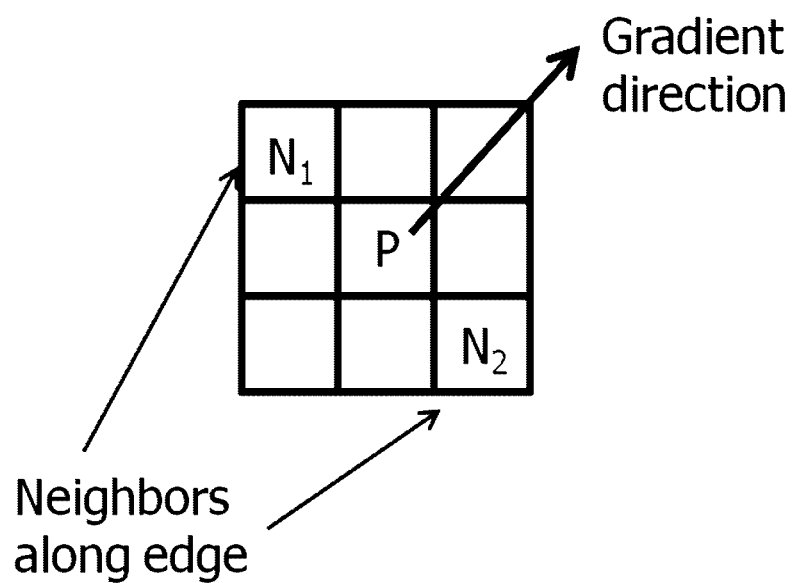
FIG. 8 depicts an exemplary measurement of how consistent the phase direction of the ship pixels is, according to some embodiments of the present invention.

The process then calculates features designed to measure how consistent the phase direction of the ship pixels is relative to the principal phase. It is expected that for real ships, a large percentage of the high magnitude edge pixels will be oriented along the ship direction or perpendicular to the ship direction, but more randomly distributed for false alarms. This process also measures the consistency of the gradient magnitude of a pixel with its immediate (for example, two) neighbors in the direction perpendicular to the gradient phase, as shown in FIG. 8. FIG. 8 shows immediate along edge neighbors for a single pixel whose gradient points up and to the right. The feature computes the sum over all the pixels in the ship candidate segment of the edge phase difference between the phase at the pixel (P in the figure) and the phase of its immediate along-edge neighbors ($N_1$ and $N_2$ in the figure). This sum is then averaged by dividing by the number of pixels in the segment. An additional feature is computed by dividing by the sum of the gradient magnitude over all the pixels. Thus regions (like wakes or turbulent water) with disorganized gradients have higher feature values than ships. The above gradient vector is just an example to show what the along-edge neighboring pixels would be.

As explained above, the principal OSD false alarms are due to white caps, surf lines, ship wakes and other rough water, and clouds. In studying the image intensities of these false alarms, it was observed that a false alarm's intensities usually have more local randomness than real ships. For example, a white cap or surf line has less organized intensities than the ship. Novel texture features are developed to exploit this characteristic to eliminate false alarms and to identify wakes that may have been included in the ship segment. Wake pixels in the ship segment tend to dilute a ship's features and therefore can make the ship appear more like a false alarm and can cause the OSD application to report an inaccurate length for the ship. Another observation is that for most ships with wakes, the ship end of the outline has very different texture from the wake end.

The texture features are capable of identifying ships with wakes so that the wakes can be removed from the ship outline. Since the pixel intensities and gradients in the wake region of the outline are more chaotic and the edges are not as sharp, the texture metrics are designed to exploit these phenomena at each end of the ship outline. On each end, the computer implemented process uses the region that extends from the end to a portion of, for example, 40% of the way toward the midpoint of the principal length dimension. For each end region, the mean intensity, gradient magnitude and the intensity range are calculated, in block 508. The intensities of the 8 immediate neighbors of the pixel are also examined, the fourth largest difference is selected and the average of that metric is computed over all the pixels in the end region.

Referring back to FIG. 5, the average gradient phase difference between the phase at the pixel and the phases of its two immediate neighbors in the cross-phase direction (i.e., along edge direction), in block 510. The average of this phase difference metric and a weighted average where the weight is the gradient magnitude at the pixel are also computed. These metrics are combined and normalized in several ways to get features that discriminate the ship end from the wake end.

In some embodiments, a weighted histogram of the gradient phases (modulo 180) is generated using a bin width of, for example, 5 degrees with the gradient magnitude as the weight factor, in block 512. From the histogram, the standard deviation of the counts of two consecutive bins over the entire histogram is computed. The wakes which have more chaotic phases and softer edges typically have a much smaller standard deviation.

In some embodiments, the invention computes the fraction of pixels that have a larger intensity than all of its 8 immediate neighbors. The churned water of the wake tends to have a higher fraction than the ship. The feature values at the two ends are compared to determine if a wake is present. If so, the process slides the wake end 40% interval toward the ship end and recalculates the texture features until it can no longer detect a significant difference between the wake and the ship. In some embodiments, these texture features may also be used for the ship classification process including computing texture features over the entire ship outline since they are effective at distinguishing ships from surf lines just as they are in distinguish a ship from its wake.

Figure 9:
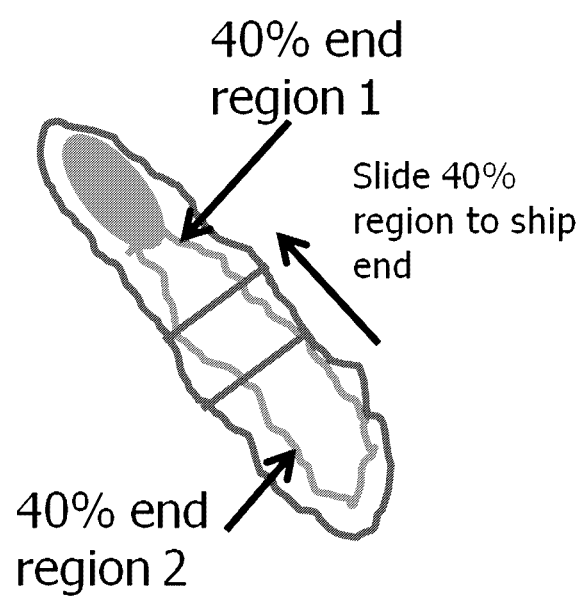
FIG. 9 shows a ship candidate with a wake and its end regions, according to some embodiments of the present invention.

FIG. 9 shows a ship candidate with a wake and its end regions, according to some embodiments of the present invention. When a ship candidate is segmented from the background and outlined, a ship candidate with a wake may have some or most of the wake included in the segment, i.e., inside the outline. Since the churned water of the wake tends to have softer and less organized edges than the ship, further texture features are developed to measure this phenomenon.

In some embodiments, three texture features i) the phase difference with the two immediate along edge neighbors, ii) the absolute difference of a pixel's intensity with its immediate 8 neighbors and taking the metric to be the fourth largest difference, and iii) adding the pixel's gradient magnitude to the histogram bin of the pixel's gradient phase and then the standard deviation of the sum of every two bins in the histogram are computed at every pixel in one end region and averaged and also computed at every pixel in the other end region and averaged. This is first done for the 40% regions at each end of the outline, as shown in FIG. 9. The texture feature values computed at each of the two 40% end regions are compared. If the values are not significantly different, it is determined that the ship segment does not include a wake. However, if all three texture features are consistently more "wake-like" on one end than the other, then it is determined that the wake is part of the ship segment.

The task now is to determine the extent of the wake and remove it from the ship candidate. Keeping the ship end feature values fixed as computed, the inventive process slides the 40% region of the wake end toward the ship end and recomputes the features over the new region. This sliding is done along the ship's length vector as previously computed and illustrated in FIG. 7. Each time the 40% wake region is moved toward the ship end and the texture features recomputed, the process may again test (with slightly relaxed thresholds than the original wake determination) the new feature values against the ship end.

Since many ships produce a wake that is narrower than the ship itself, in some embodiments, the invention measures the median width in a mid-rage, for example, 40% range on each end. If one end is significantly narrower than the other end and the narrow end has more wake-like texture features than the wide end (whether the ship passed the wake texture thresholds or not), the candidate is identified as having a wake.

As explained above, whitecaps and surf lines are the principal source of false alarms and the hardest types of false alarms to separate from real ships. It was observed by the inventor that the brightest pixels in the whitecap and surf outlines tend to run in an approximate line along the length of the candidate's segment, however, real ships do not usually exhibit this characteristic. Consequently, special features are developed to measure the spatial distribution of the brightest pixels along the length of the segment. As the process steps down the length of the segment, the brightest pixel in the cross-ship direction is identified and the cross-position difference is accumulated with that of the brightest pixel from the previous step.

False alarms with a line of bright pixels will have a smaller average distance than real ships whose bright pixels are not usually distributed in such a way. The computer implemented process of the present invention sums the gradient magnitude and the intensity at these pixels and sums the intensities of all the other pixels that are not the brightest pixel. It then computes the average gradient magnitude and the average intensity of all the brightest pixels and also computes the ratio of the average intensity of all the non-brightest pixels to the intensity of the brightest pixels as a feature to use either in thresholding or one or more classifiers or both.

In some embodiments, the invention computes several other novel features to measure the distribution of the bright pixels. For example, a process marks the locations of the brightest 10% of the pixels in the interior of the outline, computes a quadratic fit to the pixels and measures the residuals. A real ship will have a larger average residual than a surf line. Since false candidates are most likely show up in turbulent water in which the brightest pixels are randomly distributed, a process collects these brightest 10% pixels in the ship segment into contiguous segments and finds the largest segment. For ships, the largest segment is usually a significant percentage of the total number of bright pixels. For a candidate with random bright speckles it is significantly smaller.

In some embodiments, the invention generates a category of features that measure the shape of the outline. The first group of features is the same set that were used to decide the acceptability of a ship outline, as described above. For the final ship outline, these features are retained for use in the classification. False alarms often have more irregular outlines than real ships. As a result, the ratio of the number of pixels in the segment to the number of pixels in the segment's convex hull is useful and so is the ratio of the number of boundary pixels to the number of pixels in the rectangular bounds of the segment. The invention may also measure the average width of the segment as it is being traversed along its length and computes the standard deviation of the width intervals. The pixel positions of these outside pixels on each side of the ship are then preserved. A quadratic fit is then performed to the pixels from each side. Based on the viewing geometry of the sensor, the invention determines the up-sensor side and the down-sensor side. It is expected that the down-sensor side (which includes the silhouette of the ship's superstructure) to be more irregular than the up sensor side, which ideally follows the ship's water line. The ratio of the average down-sensor fit residual to that of the up-sensor side is then calculated.

An OSD screener finds candidates by looking for contrast with the background using ordered sums. Therefore, the screener often finds candidates along a single edge, such as a cloud edge. In this case, strong gradients are expected in the principal phase direction, but not in the opposite direction. To measure this, the average gradient magnitudes for ship segment pixels whose phases are pointing in the cross-ship direction one way and in the other are computed. For candidates along a single edge the ratio of the weaker sum to the stronger sum will be small.

In summary, the present invention computes many different novel features, some of which are optional. The distribution of these features are then analyzed to determine the best features and how to use them in a classification system (described below) to optimally separate real ships from false alarms.

Figure 6:
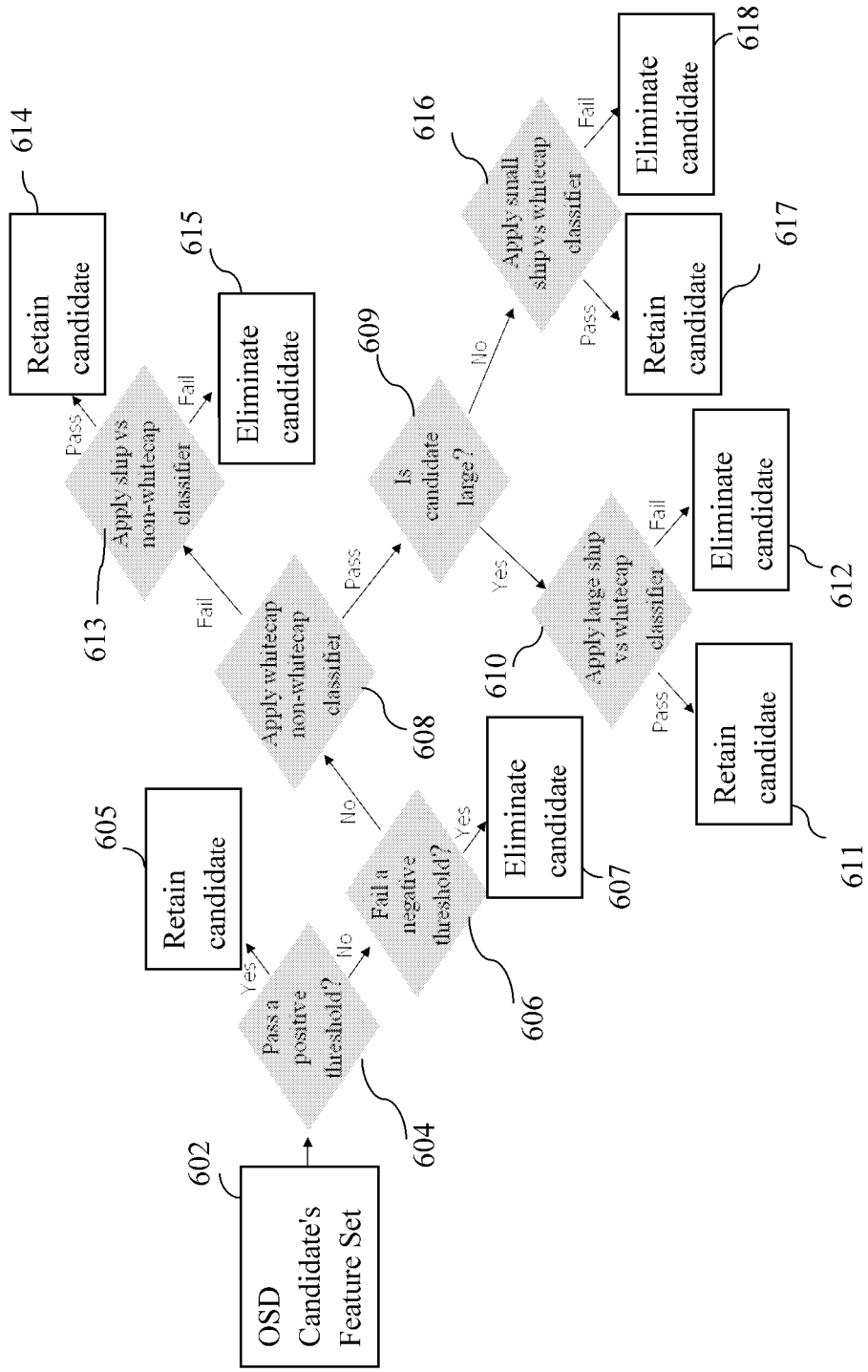
FIG. 6 illustrates an exemplary false alarm rejection process for feature evaluation and training process, according to some embodiments of the present invention.

FIG. 6 illustrates an exemplary false alarm rejection process for the feature evaluation and training process, according to some embodiments of the present invention. As described above, the ship features were ground truthed into three categories: ship, white caps (and surf lines), and non-white caps, which includes clouds and rough water, but not rough enough to cause a white cap. To analyze the computed features to determine which features are most effective in distinguishing ships from false alarms, training data was collected from OSD candidates (602) generated from an image database that included a variety of ship types, weather conditions, sea states and imaging geometries and resolutions. The ground truth included hundreds of ships and thousands of false alarms. The ship and false alarm distributions were analyzed separately for each feature and in combinations. This analysis led to the false alarm rejection procedure illustrated in FIG. 6. Using a histogram tool and a threshold analysis tool, it was observed that a significant percentage of the ships had at least one feature that was better than all (or almost all) of the false alarms. A set of positive thresholds (604) were developed so that if a candidate had at least one feature that exceeded one of these thresholds it was automatically retained (605) as a real ship. These thresholds retained almost half of the ships and less than four percent of the false alarms. Next, a set of threshold ranges that included all of the ships but eliminated many of the false alarms were determined. These thresholds eliminated almost half of the false alarms and none of the ships.

In some embodiments the candidates that were neither automatically retained by the positive thresholds nor automatically eliminated by the negative thresholds we apply a series of Mahalanobis distance classifiers. Though other more complex types of classifiers can be used, they must be carefully trained to ensure robustness. Use of the Mahalanobis distance classifier prevents over-training on the ground truthed feature data set. It was observed during training that the feature distributions for white caps and surf lines were significantly different from other types of false alarms. This observation resulted in the decision to divide the false alarm set into those two groups. A classifier was trained to separate these two groups of false alarms. This Mahalanobis distance classifier separated the two groups well, with more than 95% of each group being classified correctly. This whitecap/non-whitecap classifier was applied to the ship candidates to split the ship feature data into two sets. Mahalanobis classifiers were trained separately for each class to separate ships from false alarms. Analysis showed that for the white-cap class we could better separate ships from false alarms if we trained separately on large candidates and on small candidates. So four Mahalanobis classifiers were trained, 608, 610, 613 and 616.

Applying the entire classification procedure to the ground truth feature data resulted in 99% retention of ships and only 18% of false alarms. In other words, 82% of the false alarm candidates were rejected at the expense of only 1% of the ship candidates.

The training describe above determines which features to use in thresholds and classifiers. In some embodiments, which features to use in each one of the blocks in FIG. 6 is controlled by a parameter file that can be changed without changing the software implementation.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims.

What is claimed is:

1. A computer implemented method for rejecting false alarms in a plurality of preliminary detected ship candidates, the method comprising:
   receiving an image including the plurality of preliminary ship candidates;
   computing intensity and gradient statistics from an image background around each of the preliminary ship candidates;
   determining a set of thresholds from the computed intensity and gradient statistics;
   determining an outline and an orientation for each of the preliminary ship candidates, using the computed intensity and gradient statistics;
   extracting a plurality of features from each of the outlines and orientations of the preliminary ship candidates, wherein the plurality of features includes intensity-based features, gradient-based features, texture-based features and shape-based features; and
   rejecting false alarms in the plurality of preliminary detected ship candidates using the extracted features and the determined thresholds and statistical distance classifiers.

2. The method of claim 1, wherein determining a set of thresholds further comprises dynamically determining thresholds for segmenting the ship candidates from their respective background, from the image background intensity and gradient statistics.

3. The method of claim 1, further comprising determining a dimension and orientation for each of the preliminary ship candidates.

4. The method of claim 1, further comprising determining the shape of and a convex hull for each of the preliminary ship candidates.

5. The method of claim 1, wherein determining an outline for each of the preliminary ship candidates further comprises:
   computing a gradient magnitude for each pixel in a region around the centroid of the preliminary ship candidate;
   determining a gradient threshold to mark an initial set of candidate ship pixels in said region;
   marking pixels from the background and said region, when said gradient threshold is below a first predetermined threshold;
   marking a portion of the pixels in said region, when said gradient threshold is above a second predetermined threshold;
   generating a histogram for the gradient magnitudes in said region and in four background quadrants;
   accumulating the marked portion of the pixels in said a region around the centroid into a contiguous segments;
   determining which segment are part of ship segment; and
   rejecting segments that are not part of the ship segment.

6. The method of claim 5, further comprising eliminating segments that are smaller than a third predetermined threshold to be a ship segment.

7. The method of claim 5, wherein generating a histogram for the gradient magnitudes in said region and in four background quadrants further comprises:
   generating a second histogram for each of the four background quadrants from the pixels in that quadrant; and
   computing a median gradient for said region around the centroid;
   selecting a second smallest $75^{th}$ percentile value over the four background quadrants for a background gradient.

8. The method of claim 1, wherein determining an orientation for each of the preliminary ship candidates further comprises:
   determining the shape of and a convex hull for each of the preliminary ship candidates;
   determining an ordered set of vertices of the convex hull of each of the preliminary ship candidates;
   augmenting each ordered set of vertices by a midpoint between every consecutive pair of vertices;
   determining a ship length vector from line segments between any two vertices; and
   determining the orientation from the ship length vector.

9. The method of claim 1, further comprising eliminating whitecaps in each of the preliminary ship candidates.

10. The method of claim 9, wherein eliminating whitecaps in each of the preliminary ship candidates further comprises:
- identifying brightest pixel in a cross-ship direction with intensities greater than a fourth predetermine threshold;
- accumulating a cross-position difference with the brightest pixel;
- summing gradient magnitudes and intensities at the brightest pixels;
- summing the intensities of all the other pixels that are not the brightest pixels;
- computing an average gradient magnitude and an average intensity of all the brightest pixels;
- computing a ratio of the average intensity of all the non-brightest pixels to the intensity of the brightest pixels as a whitecap feature; and
- using the whitecap feature by a classifier to eliminate the whitecaps in each of the preliminary ship candidates.

11. The method of claim 1, wherein the gradient-based feature and the phase-based feature are calculated by using the gradient magnitude at each pixel in a ship segment.

12. The method of claim 1, wherein the gradient-based feature include one or more of the group a maximum gradient, a mean gradient and standard deviation, a difference between $80^{th}$ percentile value and $20^{th}$ percentile value, contrast with the background pixels and a fraction of pixels with good contrast with the background.

13. The method of claim 1, wherein the phase-based feature are calculated determining a principal phase direction by using a weighted sum histogram with the gradient magnitude at a pixel as a weight factor; determining the principal phase direction using a two-pane summing window over the histogram; and selecting a center of a window with the largest sum as the principal phase direction.

14. The method of claim 1, further comprising eliminating wakes in each of the preliminary ship candidates.

15. The method of claim 14, wherein eliminating wakes in each of the preliminary ship candidates further comprises:
- for each end region that extends from an end of the preliminary ship candidate to a portion of the way toward a midpoint of a principal length dimension, computing a mean intensity, gradient magnitude and an intensity range;
- examining intensities of the eight immediate neighbors of each pixel in the end region;
- selecting the fourth largest difference of intensity of said each pixel with its eight immediate neighbors;
- computing the average of that difference metric over all the pixels in the end region;
- computing an average gradient phase difference between a phase at the pixel and a phases of two immediate neighbors of the pixel in a cross-phase direction;
- computing an average of said gradient phase difference and a weighted average of the gradient magnitude at the pixel;
- generating a weighted histogram of modulo 180 of the gradient phases having a selected bin width, using the gradient magnitude as the weight factor;
- computing a standard deviation of counts of two consecutive bins over the entire histogram, from the histogram;
- comparing the computed standard deviation to a predetermined standard deviation; and
- eliminating the regions that have a standard deviation smaller than the predetermined standard deviation as wakes.

16. The method of claim 14, wherein eliminating wakes in each of the preliminary ship candidates further comprises:
- for each end region that extends from an end of the preliminary ship candidate to a portion of the way toward a midpoint of a principal length dimension, computing a mean intensity, gradient magnitude and an intensity range;
- measuring a median width in a mid-range of each end region;
- when one end region is significantly narrower than the other end and the narrower end region has a standard deviation smaller than a standard deviation of the wider end, identifying the narrower region as a wake region; and
- eliminating the wake region.

* * * * *